May 26, 1964     M. SORGO     3,134,342
TUBULAR FRAME FOR MOUNTAIN CABLE-WAY CABIN
Filed Feb. 24, 1961     4 Sheets-Sheet 1

May 26, 1964 M. SORGO 3,134,342
TUBULAR FRAME FOR MOUNTAIN CABLE-WAY CABIN
Filed Feb. 24, 1961 4 Sheets-Sheet 3

*INVENTOR.*

*BY*

May 26, 1964 M. SORGO 3,134,342
TUBULAR FRAME FOR MOUNTAIN CABLE-WAY CABIN
Filed Feb. 24, 1961 4 Sheets-Sheet 4

INVENTOR.

BY

United States Patent Office 3,134,342
Patented May 26, 1964

3,134,342
TUBULAR FRAME FOR MOUNTAIN
CABLE-WAY CABIN
Michael Sorgo, Innsbruck, Austria, assignor to Gebr.
Kollensperger, Innsbruck, Austria, a trading company
Filed Feb. 24, 1961, Ser. No. 91,501
Claims priority, application Austria Mar. 29, 1960
5 Claims. (Cl. 105—150)

The present invention relates to a cable-way cabin the walls of which extend along vertical lines of curvature, characterized in that at least one closed tubular frame is used as a support for said walls.

The use of tubular frames as a support for cable-way cabins offers many advantages, not only because it saves weight but also because of the excellent static and dynamic properties of such frames and further because of the possibility of manufacturing the cabin in whatever shape as may be required, since the tubes are adapted to be formed in any appropriate shape. The tubular frame may thus consist of a single tube suitably bent and welded at the contact points. It is also possible to use a plurality of tube parts bent in suitable manner and welded into a unit.

Several embodiments of the invention will now be described, by way of example, with reference to the accompanying drawings.

Figure 1:
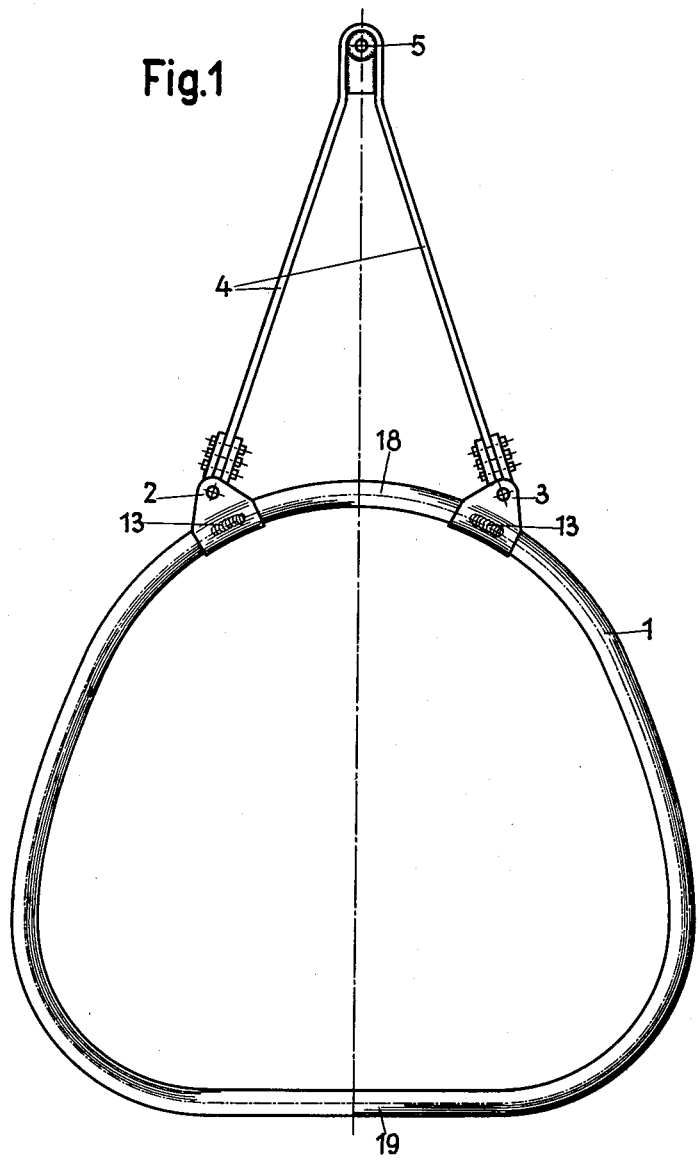
FIG. 1 is a view of a tubular frame and suspension therefor looking in the direction of travel of the frame.

The tubular frame 1 illustrated in FIG. 1 differs from the rectangular shape usually provided in cable-way cabins for the supporting frame composed of assorted members assembled together. The tubular frame is closed in itself and may have a circular, elliptic or oval shape or any other suitable generally curved shape. In the embodiment illustrated in FIG. 1 the tubular frame is nearly oval-shaped in the roof part 18 while the bottom 19 is substantially straight-lined. In the roof part 18 the tubular frame 1 is grasped by suspension clips 2, 3 which are connected to the inverted V-shaped supporting frame 4. The tubular frame 1 may be attached to said suspension clips 2, 3 by clamping or welding means. The embodiment shown in FIG. 1 is adapted for a cabin running on a two-cable-way so that the suspension pin 5 serves as the connection to a conveyor mechanism not represented in the drawing.

Figure 2:
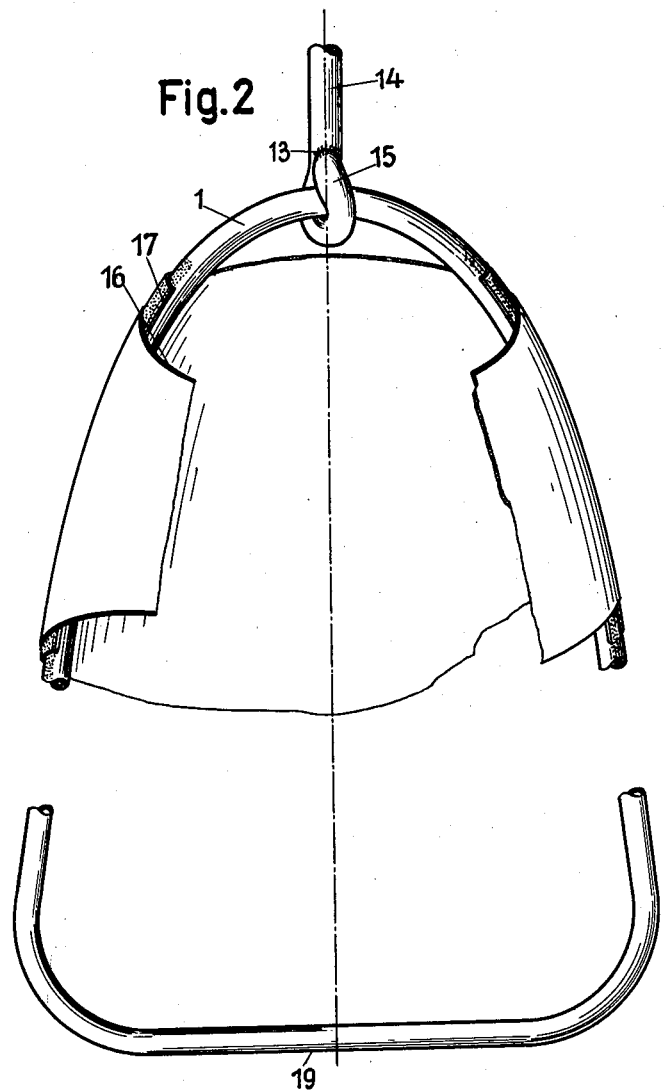
FIG. 2 is a diagrammatic view of another embodiment.

In the embodiment shown in FIG. 2, specially suitable for a one or two-person cabin on a single-cable-way, there is instead of the suspension clips 2, 3 a simplified suspension device in the shape of a suspension hook 15. Said hook may be fixed on the supporting rod 14. When the tubular frame is hung, the hook 15 is bent closed and secured by welding to prevent accidental opening and release of the frame. Reference numeral 13 indicates the weld.

Figure 3:
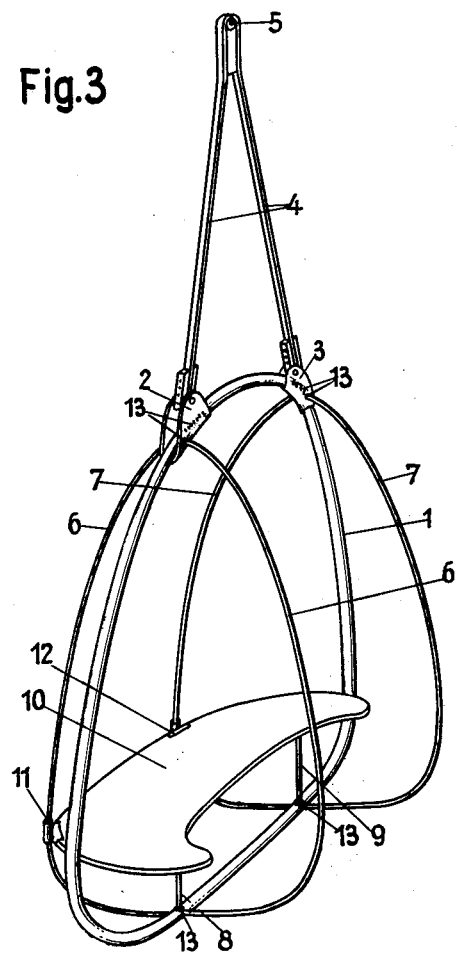
FIG. 3 shows still another embodiment.

The embodiment shown in FIG. 3 is adapted for large size cabins, for example cabins able to carry four people, the main tubular frame 1 is suitably connected to tubular cross frames 6, 7 extending in the direction of travel. The three tubular frames shown in the embodiment are preferably united by welding at 13. At the points of intersection of the tubular frames 1, 6 and 7 brackets 8, 9 are welded to provide the legs of the seat 10. Seat 10 is suitably connected at its rear by clamping or other attaching means 11, 12 to the tubular frames 6, 7.

Figure 4:
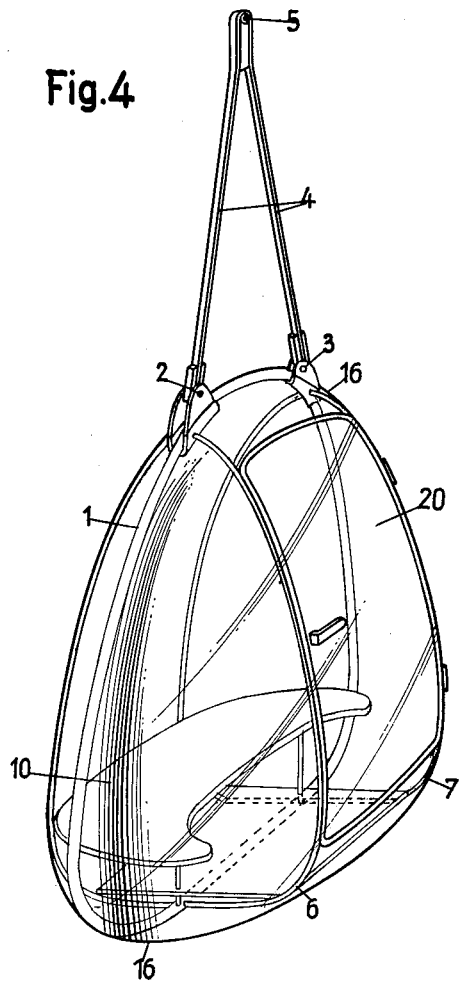
FIG. 4 shows the embodiment of FIG. 3 with a housing.

FIG. 4 shows the tubular frame construction in phantom within the transparent cabin covering 16. The seat 10 is for example so constructed as to fit four people whose line of vision faces in the direction of a door 20. The tubular frame 1 extending in the direction of travel is preferably of a greater width than the cross frames 6, 7 extending perpendicular to the direction of journey.

The covering 16, made from sheet metal, plastics or the like, may be connected in any suitable way to the tubular frame. It is desirable to provide a padding of rubber strips 17 or the like between the metal tubular frame 1, and the covering 16, as seen in FIG. 2. Fastening means to unite the tubular frames 1, 6, 7, the rubber strips 17 and the housing 16 may include glue, screws, rivets, and clips.

During cold weather the tubular frame construction according to the invention enables providing a covering which may be of small wall thickness. Though said housings afford protection against inclement weather. It is a supplementary advantageous feature of the invention to provide heating elements at least inside one of the tubular frames. Said heating elements may lead to a socket fixed on the exterior wall of the cabin. At the stations the heating system may be placed in operation by inserting a plug in the socket, so that warm cabins will be ready for service.

What I claim is:

1. A cable way cabin adapted for being suspended from a cable and for being transported in freely suspended relation by the cable, the cabin comprising a single rigid one piece hollow tubular element in the form of a closed loop lying in a plane, the single tubular element constituting by itself the structural frame of the cabin, means for connecting only the tubular element to the cable such that the plane of the tubular element is perpendicular to the direction of travel of the cabin and means enclosing said tubular element and coupled thereto to form an enclosure for the cabin.

2. A cable way cabin adapted for being suspended from a cable and for being transported in freely suspended relation by the cable, the cabin comprising a single rigid one piece hollow tubular element in the form of a closed ring lying in a plane, the single tubular element constituting by itself the structural frame of the cabin, a supporting frame suspending the tubular element from the cable such that the plane of the tubular element is perpendicular to the direction of travel of the cabin, the supporting frame comprising a V-shaped tubular element converging upwardly towards said cable and passing therearound, the ring shaped tubular element having an elongated substantially flat bottom portion and upwardly converging side portions extending from the bottom portion, the V-shaped tubular element being connected to the ring shaped element at a pair of locations on opposite sides of a vertical plane passing through the cable and means coupled to and surrounding and enclosing the ring shaped tubular element to form an enclosure for the cabin.

3. A cable way cabin adapted for being suspended from a cable and for being transported in freely suspended relation by the cable, the cabin comprising a single one piece tubular element in the form of a closed ring lying in a plane, a supporting frame suspending the tubular element from the cable such that the plane of the tubular element is perpendicular to the direction of travel of the cabin, second and third tubular elements also of closed ring form, means connecting the second and third tubular elements to the first said ring and in planes perpendicular thereto whereby all of said rings form a structural frame for the cabin, the supporting frame comprising a V-shaped tubular element converging upwardly towards said cable and passing therearound, the first said ring having an elongated substantially flat bottom portion and upwardly converging side portions extending from the bottom portion, the V-shaped tubular element being connected to the first said ring at a pair of locations on opposite sides of vertical plane passing through the cable and sheet-like means coupled to the rings to form an enclosure for the cabin.

4. A cabin as claimed in claim 3 comprising padding means between the rings and the sheet-like means.

5. A cable way cabin adapted for being suspended from a cable and for being transported in freely suspended relation by the cable, the cabin comprising a single rigid one piece hollow tubular element in the form of a closed symmetrical ring lying in a plane, the single tubular element by itself constituting the structural frame of the cabin, a supporting frame constituted by an upwardly converging V-shaped tubular element suspending the ring from the cable such that the plane of the tubular element is perpendicular to the direction of travel of the cabin, the ring being in the shape of a flattened oval with a straight bottom portion and upwardly converging curved side portions, the supporting frame being connected to the ring at spaced locations symmetrically arranged with respect to the vertical axis of symmetry of the ring, the V-shaped frame upwardly converging in symmetrical fashion to pass around the cable and to suspend the ring from the cable such that the cable lies on the vertical axis of symmetry of the ring while the vertical axis substantially bisects the angle formed by the V-shaped frame, and means surrounding and enclosing the ring to form an enclosure for the cabin.

References Cited in the file of this patent

UNITED STATES PATENTS

| | | |
|---|---|---|
| 1,411,845 | Dodge | Apr. 4, 1922 |
| 2,009,614 | Geyer | July 30, 1935 |
| 2,056,217 | Stout | Oct. 6, 1936 |
| 2,130,131 | Hirshfeld | Sept. 13, 1938 |
| 2,223,746 | Stoner | Dec. 3, 1940 |
| 2,247,273 | Blomberg | June 24, 1941 |
| 2,766,705 | Flowers | Oct. 16, 1956 |
| 2,857,630 | Bishop | Oct. 28, 1958 |
| 2,899,913 | Zeidler | Aug. 18, 1959 |
| 2,925,788 | Ketley | Feb. 23, 1960 |

FOREIGN PATENTS

| | | |
|---|---|---|
| 93,952 | Switzerland | Apr. 1, 1922 |